US007505453B2

(12) United States Patent
Carpenter et al.

(10) Patent No.: US 7,505,453 B2
(45) Date of Patent: *Mar. 17, 2009

(54) NETWORK-ENABLED, EXTENSIBLE METERING SYSTEM

(75) Inventors: Richard Christopher Carpenter, Fuquay-Varina, NC (US); Raymond Kelley, Raleigh, NC (US); Sean Michael Scoggins, Raleigh, NC (US); Sasan Ardalan, Cary, NC (US)

(73) Assignee: Elster Electricity, LLC, Raleigh, NC (US)

( * ) Notice: Subject to any disclaimer, the term of this patent is extended or adjusted under 35 U.S.C. 154(b) by 203 days.

This patent is subject to a terminal disclaimer.

(21) Appl. No.: 11/432,959

(22) Filed: May 11, 2006

(65) Prior Publication Data

US 2006/0209844 A1 Sep. 21, 2006

Related U.S. Application Data

(63) Continuation of application No. 09/798,084, filed on Mar. 2, 2001, now Pat. No. 7,046,682, which is a continuation-in-part of application No. 09/022,718, filed on Feb. 12, 1998, now Pat. No. 6,396,839.

(60) Provisional application No. 60/039,716, filed on Feb. 12, 1997.

(51) Int. Cl.
*H04L 12/66* (2006.01)
(52) U.S. Cl. .................. 370/352; 370/465; 709/203
(58) Field of Classification Search ............ 370/395.52, 370/352, 465, 466, 467; 709/203
See application file for complete search history.

(56) References Cited

U.S. PATENT DOCUMENTS

| 3,445,815 | A | 5/1969 | Saltzberg et al. ............. 340/163 |
| 3,858,212 | A | 12/1974 | Tompkins et al. ...... 343/100 CS |
| 3,878,512 | A | 4/1975 | Kobayashi et al. ....... 340/168 R |
| 3,973,240 | A | 8/1976 | Fong ........................... 340/151 |
| 4,031,513 | A | 6/1977 | Simciak .................... 340/152 T |
| 4,056,107 | A | 11/1977 | Todd et al. ................. 130/27 R |
| 4,132,981 | A | 1/1979 | White ......................... 340/203 |
| 4,190,800 | A | 2/1980 | Kelly, Jr. et al. .............. 325/37 |
| 4,204,195 | A | 5/1980 | Bogacki ...................... 340/151 |
| 4,218,737 | A | 8/1980 | Buscher et al. ............. 364/493 |
| 4,250,489 | A | 2/1981 | Dudash et al. ............ 340/147 T |
| 4,254,472 | A | 3/1981 | Juengel et al. ............... 364/900 |
| 4,319,359 | A | 3/1982 | Sepp .............................. 375/1 |
| 4,321,582 | A | 3/1982 | Banghart ................ 340/310 R |
| 4,361,890 | A | 11/1982 | Green, Jr. et al. ............... 375/1 |
| 4,405,829 | A | 9/1983 | Rivest et al. ............. 178/22.14 |
| 4,415,896 | A | 11/1983 | Allgood .................. 340/870.03 |
| 4,466,001 | A | 8/1984 | Moore et al. ........... 340/825.08 |

(Continued)

*Primary Examiner*—Brian D Nguyen
(74) *Attorney, Agent, or Firm*—Woodcock Washburn LLP

(57) ABSTRACT

To allow meter data users to have access to needed information and at the same time address the rapidly shifting requirements of the deregulated marketplace, a new business model employs a common metering device that measures raw data and a system composed of independent services or applications that collect and process raw metered data and then make that data available to interested parties. This new model removes the dependence upon an automatic meter reading (AMR) system provider, as the sole provider, by creating a system to enable a competitive environment where services (applications, information, networking, etc.) rather than systems are selected and paid for on a leased or pay-per-use basis.

11 Claims, 9 Drawing Sheets

(Network-enabled, Extensible Metering System)

U.S. PATENT DOCUMENTS

| | | | |
|---|---|---|---|
| 4,504,831 A | 3/1985 | Jahr et al. | 340/870.03 |
| 4,506,386 A | 3/1985 | Ichikawa et al. | 455/343 |
| 4,525,861 A | 6/1985 | Freeburg | 455/33 |
| 4,600,923 A | 7/1986 | Hicks et al. | 340/870.02 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825.01 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzmeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swarztrauber et al. | 364/483 |
| 4,827,514 A | 5/1989 | Ziolko et al. | 380/48 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/370.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,086,292 A | 2/1992 | Johnson et al. | 340/637 |
| 5,090,024 A | 2/1992 | Vander Mey et al. | 375/1 |
| 5,111,479 A | 5/1992 | Akazawa | 375/1 |
| 5,115,448 A | 5/1992 | Mori | 375/1 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/370.02 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,307,349 A | 4/1994 | Shloss et al. | 370/85.2 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |
| 5,475,742 A | 12/1995 | Gilbert | 379/106 |
| 5,475,867 A | 12/1995 | Blum | 455/53.1 |
| 5,479,442 A | 12/1995 | Yamamoto | 375/206 |
| 5,481,259 A | 1/1996 | Bane | 340/870.03 |
| 5,491,473 A | 2/1996 | Gilbert | 340/870.01 |
| 5,493,287 A | 2/1996 | Bane | 340/825.52 |
| 5,495,239 A | 2/1996 | Ouellette | 340/870.02 |
| 5,497,424 A | 3/1996 | Vanderpool | 380/34 |
| 5,499,243 A | 3/1996 | Hall | 370/85.8 |
| 5,500,871 A | 3/1996 | Kato et al. | 375/208 |
| 5,511,188 A | 4/1996 | Pascucci et al. | 395/600 |
| 5,519,388 A | 5/1996 | Adair, Jr. | 340/870.02 |
| 5,522,044 A | 5/1996 | Pascucci et al. | 395/200.06 |
| 5,526,389 A | 6/1996 | Buell et al. | 375/200 |
| 5,528,507 A | 6/1996 | McNamara et al. | 364/483 |
| 5,528,597 A | 6/1996 | Gerszberg et al. | 370/95.3 |
| 5,539,775 A | 7/1996 | Tuttle et al. | 375/200 |
| 5,541,589 A | 7/1996 | Delaney | 340/870.02 |
| 5,544,036 A | 8/1996 | Brown, Jr. et al. | 364/145 |
| 5,546,424 A | 8/1996 | Miyake | 375/206 |
| 5,548,527 A | 8/1996 | Hemminger et al. | 364/492 |
| 5,548,633 A | 8/1996 | Kujawa et al. | 379/93 |
| 5,553,094 A | 9/1996 | Johnson et al. | 375/200 |
| 5,555,508 A | 9/1996 | Munday et al. | 364/492 |
| 5,559,870 A | 9/1996 | Patton et al. | 379/107 |
| 5,566,332 A | 10/1996 | Adair et al. | 395/600 |
| 5,572,438 A | 11/1996 | Ehlers et al. | 364/492 |
| 5,590,179 A | 12/1996 | Shincovich et al. | 379/107 |
| 5,592,470 A | 1/1997 | Rudrapatna et al. | 370/320 |
| 5,594,740 A | 1/1997 | LaDue | 379/59 |
| 5,602,744 A | 2/1997 | Meek et al. | 364/464.22 |
| 5,619,685 A | 4/1997 | Schiavone | 395/500 |
| 5,621,629 A | 4/1997 | Hemminger et al. | 363/56 |
| 5,627,759 A | 5/1997 | Bearden et al. | 364/483 |
| 5,631,636 A | 5/1997 | Bane | 340/825.69 |
| 5,640,679 A | 6/1997 | Lundqvist et al. | 455/33.2 |
| 5,659,300 A | 8/1997 | Dresselhuys et al. | 340/370.02 |
| 5,684,472 A | 11/1997 | Bane | 340/870.02 |

| Patent | Type | Date | Inventor | Class |
|---|---|---|---|---|
| 5,684,799 | A | 11/1997 | Bigham et al. | 370/397 |
| 5,691,715 | A | 11/1997 | Ouellette | 340/870.09 |
| 5,692,180 | A | 11/1997 | Lee | 395/610 |
| 5,696,501 | A | 12/1997 | Ouellette et al. | 340/870.02 |
| 5,696,765 | A | 12/1997 | Safadi | 370/436 |
| 5,699,276 | A | 12/1997 | Roos | 364/514 |
| 5,715,390 | A * | 2/1998 | Hoffman et al. | 726/20 |
| 5,717,604 | A | 2/1998 | Wiggins | 364/514 C |
| 5,745,901 | A | 4/1998 | Entner et al. | 707/103 |
| 5,748,104 | A * | 5/1998 | Argyroudis et al. | 340/870.11 |
| 5,751,914 | A | 5/1998 | Coley et al. | 395/51 |
| 5,751,961 | A | 5/1998 | Smyk | 395/200.47 |
| 5,754,772 | A | 5/1998 | Leaf | 395/200.33 |
| 5,754,830 | A | 5/1998 | Butts et al. | 395/500 |
| 5,778,368 | A | 7/1998 | Hogan et al. | 707/10 |
| 5,787,437 | A | 7/1998 | Potterveld et al. | 707/103 |
| 5,790,789 | A | 8/1998 | Suarez | 395/200.32 |
| 5,790,809 | A | 8/1998 | Holmes | 395/200.58 |
| 5,805,712 | A | 9/1998 | Davis | 380/50 |
| 5,808,558 | A | 9/1998 | Meek et al. | 340/870.01 |
| 5,822,521 | A | 10/1998 | Gartner et al. | 395/200.6 |
| 5,862,391 | A | 1/1999 | Salas et al. | 395/750.01 |
| 5,872,774 | A | 2/1999 | Wheatley, III et al. | 370/335 |
| 5,874,903 | A | 2/1999 | Shuey et al. | 340/870.02 |
| 5,875,183 | A | 2/1999 | Nitadori | 370/328 |
| 5,875,402 | A | 2/1999 | Yamawaki | 455/502 |
| 5,897,607 | A | 4/1999 | Jenney et al. | 702/62 |
| 5,898,387 | A | 4/1999 | Davis et al. | 340/870.02 |
| 5,943,375 | A | 8/1999 | Veintimilla | 375/355 |
| 5,963,146 | A | 10/1999 | Johnson et al. | 340/870.01 |
| 6,000,034 | A | 12/1999 | Lightbody et al. | 713/202 |
| 6,041,056 | A | 3/2000 | Bigham et al. | 370/395 |
| 6,067,029 | A | 5/2000 | Durston | 340/870.03 |
| 6,073,169 | A | 6/2000 | Shuey et al. | 709/217 |
| 6,073,174 | A | 6/2000 | Montgomerie et al. | 709/224 |
| 6,078,251 | A | 6/2000 | Landt et al. | 340/10.41 |
| 6,078,909 | A | 6/2000 | Knutson | 705/59 |
| 6,088,659 | A | 7/2000 | Kelley et al. | 702/62 |
| 6,100,817 | A | 8/2000 | Mason, Jr. et al. | 340/870.02 |
| 6,112,192 | A | 8/2000 | Capek | 705/59 |
| 6,150,955 | A | 11/2000 | Tracy et al. | 340/870.02 |
| 6,160,993 | A | 12/2000 | Wilson | 455/12.1 |
| 6,172,616 | B1 | 1/2001 | Johnson et al. | 340/870.12 |
| 6,199,068 | B1 | 3/2001 | Carpenter | 707/100 |
| 6,836,737 | B2 * | 12/2004 | Petite et al. | 702/62 |
| 7,043,457 | B1 * | 5/2006 | Hansen | 705/80 |
| 7,057,525 | B2 * | 6/2006 | Giles et al. | 340/870.02 |
| 7,065,457 | B1 * | 6/2006 | Germer et al. | 702/64 |

* cited by examiner

Figure 1 (Exclusive Ownership Business Model)

PRIOR ART

Figure 2 (Service Bureau Business Model)
PRIOR ART

Figure 6 (Network-enabled, Extensible Metering System)

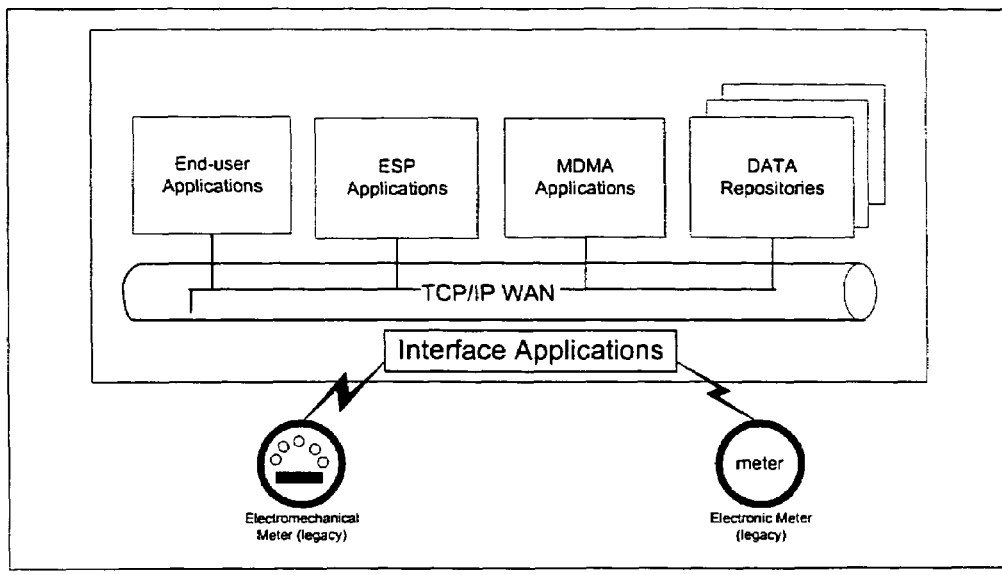
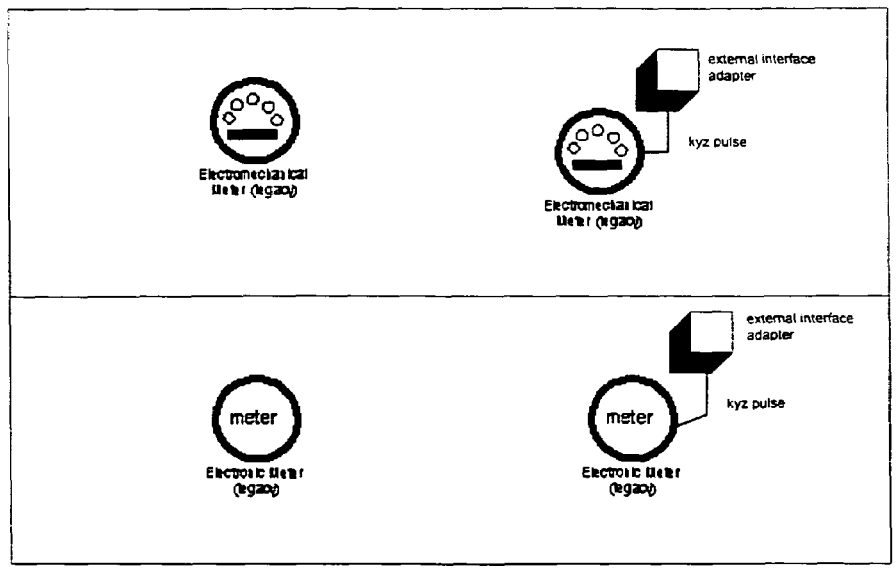
Figure 8

NETWORK-ENABLED, EXTENSIBLE METERING SYSTEM

CROSS REFERENCE TO RELATED APPLICATIONS

This is a continuation of U.S. patent application Ser. No. 09/798,084, filed Mar. 2, 2001, titled "Network-Enabled, Extensible Metering System," now U.S. Pat. No. 7,046,682, which is hereby incorporated by reference, and which is a continuation-in-part of application Ser. No. 09/022,718, now U.S. Pat. No. 6,396,839, filed Feb. 12, 1998, titled "Remote Access to Electronic Meters Using a TCP/IP Protocol Suite," which is hereby incorporated by reference and which claims priority to Provisional Patent Application Serial No. 60/039,716, filed Feb. 12, 1997.

FIELD OF THE INVENTION

The present invention relates generally to the field of utility metering (including gas, electric, water and energy metering). More particularly, the present invention relates to the integration of network systems and utility meters.

BACKGROUND OF THE INVENTION

The above-cited U.S. patent application Ser. No. 09/022,718 discloses a system generally involving electronic meters and automatic meter reading, and more particularly TCP/IP-enabled electronic utility meters for remote two-way access over local and wide area networks. The present invention is related in that it involves the use of TCP/IP-enabled, extensible utility meters in a new business model and system. Further background information about the business model aspect of the present invention is provided below.

Business Models

Currently, meter manufacturers sell meters to make money. Some revenue is generated from metering system sales, but these systems are generally viewed as just another mechanism for selling additional meters. Meter manufacturers compete by providing better metering capabilities and functionality at a lower price.

Any given type of meter, whether it is water, electric, energy, or gas, measures a bounded set of quantities. These quantities represent the raw data collected by the device. Meter manufacturers cannot use this raw metered data as a way to differentiate themselves from their competitors. Therefore, at the factory, they load their meter's firmware with embedded capabilities, improved accuracy, or other applications (e.g., time of use (TOU), power quality (PQ) and/or alarm monitoring). These firmware applications use the meter's core set of data to compute the information that their meter data users (MDUs) need. To hedge against the uncertainty of deregulation, meter data users (such as utility distribution companies (UDC), energy service providers (ESP), or meter data management agencies (MDMA), etc.) often purchase, at a low price, fully capable meters with all or some of their capabilities disabled (i.e., "turned off"). When additional functionality is needed, the MDU must purchase a license (or "key") that gives it the ability to enable ("turn on") the desired function in a meter. This method of selectively turning on meter functions allows the meter manufacturer to create new license-based pricing models to make its product more cost competitive. Thus, in reality, the meter must still be manufactured with all of the necessary hardware and applications in order to support the fullest possible range of functionality in an effort to more efficiently address possible future metering needs.

This business model has several drawbacks:

1) increased functionality in the meter requires an increase in processing power (e.g., ROM, RAM, EEPROM, etc.) and a commensurate increase in cost;
2) the memory available "under the glass" in a meter is finite (i.e., in order to add an option you must remove another option or increase the memory);
3) to upgrade or re-program a meter requires that a meter technician drive to the location, physically remove the meter (or switch it out with a replacement meter) and then return it to the "meter shop" where the upgrade can occur; after the upgrade is complete, the meter must be returned and re-installed;
4) different meters require different interfaces and different communications protocols for retrieving data;
5) increased application complexity in the firmware of the meter leads to a higher probability of errors that may require upgrades;
6) increased application functionality housed in the firmware of the meter typically requires complex configuration or programming of the end-device, which greatly increases the system management, coordination, and synchronization; and
7) meter inventory must be increased in order to accommodate different configurations, functionalities, and versions of metering devices.

With the advent of improved communication technology, manufacturers are now able to add modem, network, and radio-frequency (RF) connectivity to their meters, thus permitting remote communications between meters and various meter data retrieval systems (e.g., automated meter reading (AMR) systems). However, there are limitations associated with these methods of remote communications:

1) wireless communication with the meter is often limited to off peak hours determined by the various network providers;
2) satellite-based communications are limited to line of sight communication between the meter and the satellite, thus limiting the times when the meter may be contacted;
3) wireless and orbital satellite networks are costly, often billing per byte of data transmitted, thus limiting the amount of data which can effectively be transmitted.

Existing AMR systems are also limited in that they require several layers of applications and interfaces in order to communicate with connected meters. These layers implement the various communications protocols used by the numerous meter manufacturers and the various communications technologies that can be used to communicate with a meter (e.g., RF communication, satellite-based communication, etc.). As these meters are constantly revised, so are their communications protocols, requiring similar modifications to the AMR system. Industry standards intended to unify the communication and device protocols typically fall short by setting minimum requirements for compliance and/or providing manufacturer-specific mechanisms to allow variability and customizations. Therefore, AMR systems still often require meter-specific knowledge (e.g., communications and device protocols) to read the required data from meters offered by different manufacturers. Even with the current metering standards, the addition of a new or different meter would typically require additions and/or modifications to an AMR system.

The increasing variety of meters presents an almost insurmountable challenge to the automated meter reading industry.

Deregulation of the electricity metering industry has created even more challenges. Prior to deregulation, a utility was responsible for generating, distributing, and transmitting electricity as well as purchasing, storing and installing metering devices, collecting metered data and processing customer billing. Now, with deregulation slowly being implemented throughout the United States, those duties and responsibilities that were the exclusive responsibility of the utility can now be divided among several service companies and providers who all need access to the meter and the meter data. All of these companies require access to either the data collected from the metering devices (e.g., power quality, outage, etc.) or to the calculated/processed data (e.g., quadrant data; validated, estimated, and edited (VEE) data, etc.) for their internal use (load management and monitoring, forecasting, etc.).

Today there are two prevailing AMR System business models. We refer to these as: 1) the exclusive ownership model (depicted in FIG. 1), and 2) the service bureau model (depicted in FIG. 2). Certain AMR System deployments utilize a mixture of these two models in order to establish a workable business case, but we will discuss these models individually. FIG. 1 depicts the exclusive ownership business model and shows two scenarios for AMR Systems that utilize public communication networks and private communication networks, or so-called fixed networks. FIG. 2 depicts the service bureau business model and shows two scenarios for AMR Systems that utilize public communication networks and private communication networks. A key difference between the public and private type communication networks is that the private network requires additional up-front cost to deploy the infrastructure of the fixed network to blanket one or more service areas. Although FIGS. 1 and 2 separate the public and private communications, AMR Systems exist that can utilize a combination or mix between public communication networks and private communication networks.

In the exclusive owner business model (FIG. 1), the meter data users (MDUs) (i.e., ESPs, UDCs, MDMAs, etc.) purchase an AMR system with a significant up-front cost. In this business model, a particular MDU that is purchasing an AMR System is typically only interested in how the purchased AMR System will address its specific needs as identified in its business case. The MDU typically develops a business case that justifies the initial AMR System cost based on both measurable and non-measurable benefits. Some of the measurable benefits include:

1) meter reading staff and infrastructure reductions,
2) cost reductions for hard-to-access meter reading,
3) connect/disconnect staff reductions,
4) accurate and timely outage restoration,
5) reduction in theft or tampering.

Some of the non-measurable benefits include:

1) faster and more frequent meter readings, thus yielding a higher level of customer service/retention,
2) better positioned for competition in a deregulated energy market,
3) ability to provide other types of services (i.e., new rates, flexible billing, etc.),
4) other future uses for the metered information.

Taken alone, the measurable benefits listed above typically do not justify the expense incurred by purchasing an AMR system. Consequently, the number of large AMR System deployments has not reached expectations.

In the service bureau business model (FIG. 2), a service bureau (e.g., MDMA) purchases an AMR system with a significant up-front cost, and then provides access to the collected meter data to subscriber MDUs. This business case is built on the value of the metered information. It assumes the service bureau will recoup the cost of the AMR system by selling meter reads or metered information to multiple MDUs (ESPs, UDCs, etc.). From the perspective of the MDU, many of the quantifiable and non-quantifiable benefits discussed above can be met using this model, with timely access to the correct set of metered information. In this model, the MDUs do not own and operate the AMR System, which is the responsibility of the service bureau operator. In this model, the MDUs must pay for the information they require. This reduces the up-front costs for the MDUs over purchasing their own AMR System and provides them with a pay-per-use model. The service bureau model could create some conflicts, or perceived conflicts, when competing MDUs utilize the same service bureau for metered information. E.g., how can "MDU 1" differentiate its end-user offerings and services from a competitor, "MDU 2," that utilizes the same service bureau and consequently has access to the same type of metered information? In the service bureau model, the MDUs need to be able to add value by developing or buying applications that allow them to differentiate themselves from their competitors.

In both business models, the AMR supplier's business case is to develop and sell AMR Systems and maintenance agreements. This business case assumes that the development investment for an AMR System can be recouped through many AMR System sells. In the exclusive owner business model, the AMR System supplier is typically confronted with a customer who wants an AMR System customized to handle his/her specific business processes. These types of AMR System sales usually require the AMR supplier to perform customer specific development. AMR System sells of this type, made by an AMR supplier, increase the AMR supplier's overall development costs, deployment costs, long-term maintenance costs, and upgrade costs. In the service bureau business model, the AMR supplier is confronted with a customer who requires an AMR System that has a different set of requirements from the AMR System of the exclusive ownership model. The AMR System sold to operate as a service bureau must accommodate many different MDUs and their business processes, and must also control access to the metered data. E.g., "ESP A" cannot read the metered information for a customer of "ESP B." The service bureau AMR System is more complex because this system must accommodate all of the MDU's needs while controlling or limiting access in a secure manner. The AMR System suppliers have a problem in creating a workable business case because they make a significant development investment and cannot afford financially or from a risk management point of view to limit their systems to one business model or the other. In today's uncertain environment, it is not clear if both business models will survive the deregulation evolution. The AMR System suppliers, therefore, must identify a way to develop a system that covers all requirements for both business models, is customizable, flexible, easily adaptable, etc.

In either of the above business models, the MDUs and the service bureau operators are dependent upon the sole AMR System supplier to react quickly to solve system problems, and address new requirements that may evolve from the evolving deregulation process. Since the AMR Systems developed today are proprietary and closed, this dependency upon a sole provider is a weak link in terms of risk management for the MDUs and service bureau operators. Competition within the volatile deregulated environment hinges upon AMR System providers' ability to respond rapidly to customer needs.

SUMMARY OF THE INVENTION

To allow meter data users to have access to needed information and at the same time address the rapidly shifting requirements of the deregulated marketplace, there is a need for a new business model, and a new apparatus and system for implementing such a business model. The present invention meets this need by providing a common metering device that measures raw data and a system composed of independent services or applications that can collect and process raw metered data and then make that data available to interested parties. This new model is intended to remove the dependence upon an AMR System provider, as the sole provider, by creating a system concept to enable a competitive environment where services (applications, information, networking, etc.) rather than systems are selected and paid for on a leased or pay-per-use basis.

A networked-based, extensible metering system in accordance with the present invention comprises a network server, a wide area network coupled to the network server, and a plurality of network-enabled meters coupled to the network. The meters collect data and the network server provides at least one metering application to the meters. In addition, the meters may be programmed to communicate via a predefined protocol and to deliver a protocol interface to a storage medium on the network, which enables the network to provide the protocol interface to users or applications requiring information from the meters and the users/applications to communicate with the meters to access the required information.

Other aspects of the present invention are described below.

BRIEF DESCRIPTION OF THE DRAWINGS

FIG. 8 schematically depicts various methods for connecting legacy metering devices to the Network-enabled, Extensible Metering System.

DETAILED DESCRIPTION OF PREFERRED EMBODIMENTS

The present invention introduces a new method for generating metering revenue using new, faster and improved communication and device technologies. In this system and business model, a new meter apparatus for collecting and storing metered data and information is part of a virtual machine as is the network application system of which it is a part. By residing on the network, the meter information becomes readily accessible to other devices, applications, and users on the network. Using new object-oriented, embedded networking technologies (e.g., Sun Microsystems' Java®/Jini®, Microsoft's Universal Plug and Play®, etc.), service discovery protocols, and security mechanisms, devices (i.e., meters) and services (i.e., data collection, storage, validation, TOU, etc.) are accessible to MDUs (such as, ESP, UDC, and MDMA) that need access to raw or metered information.

An exemplary embodiment of the present invention will now be described from the perspectives of the business model and the system.

Business Model

Figure 1:
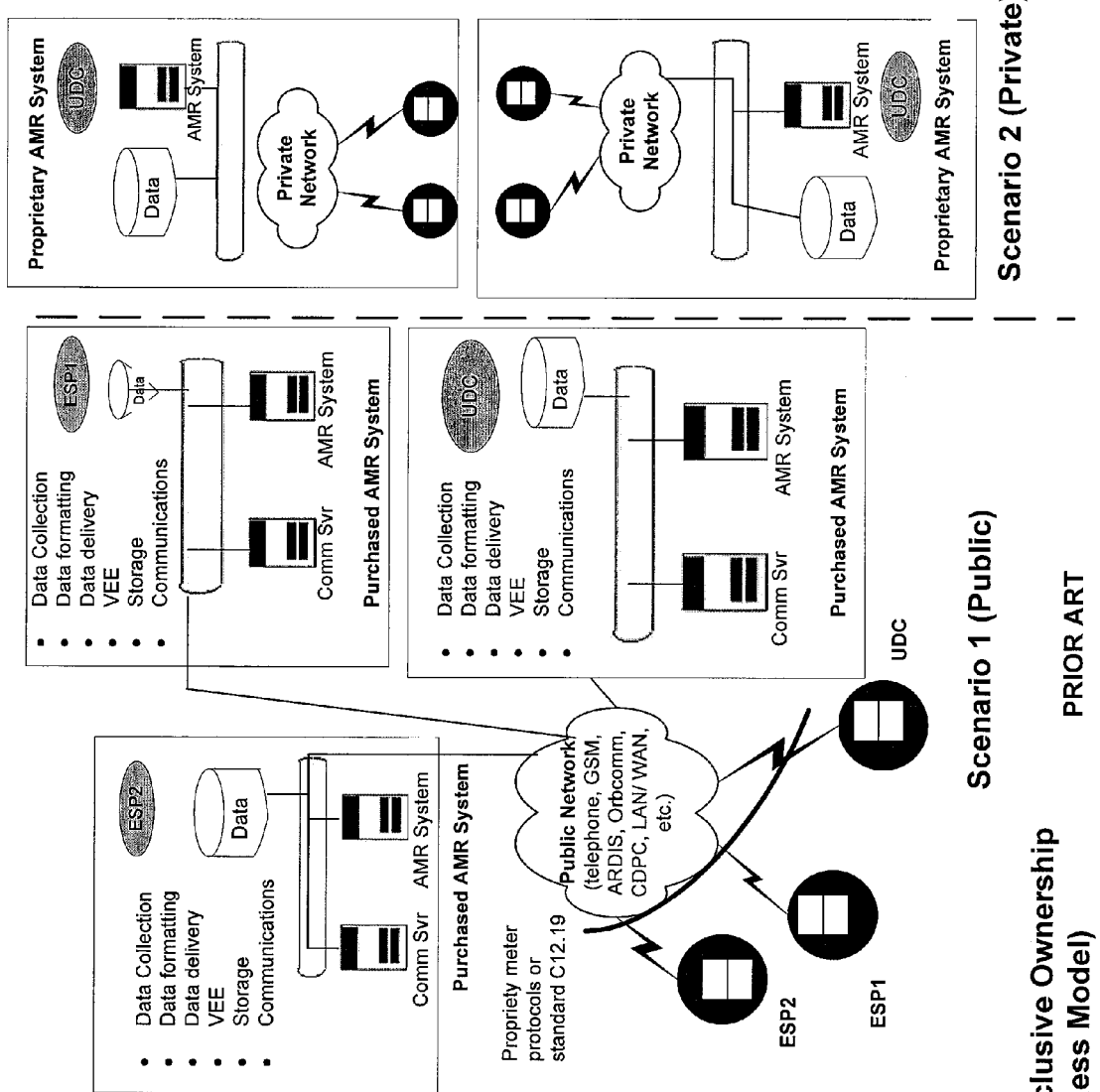
FIG. 1 schematically depicts two business scenarios that reflect current business models for exclusively-owned AMR systems.
Figure 2:
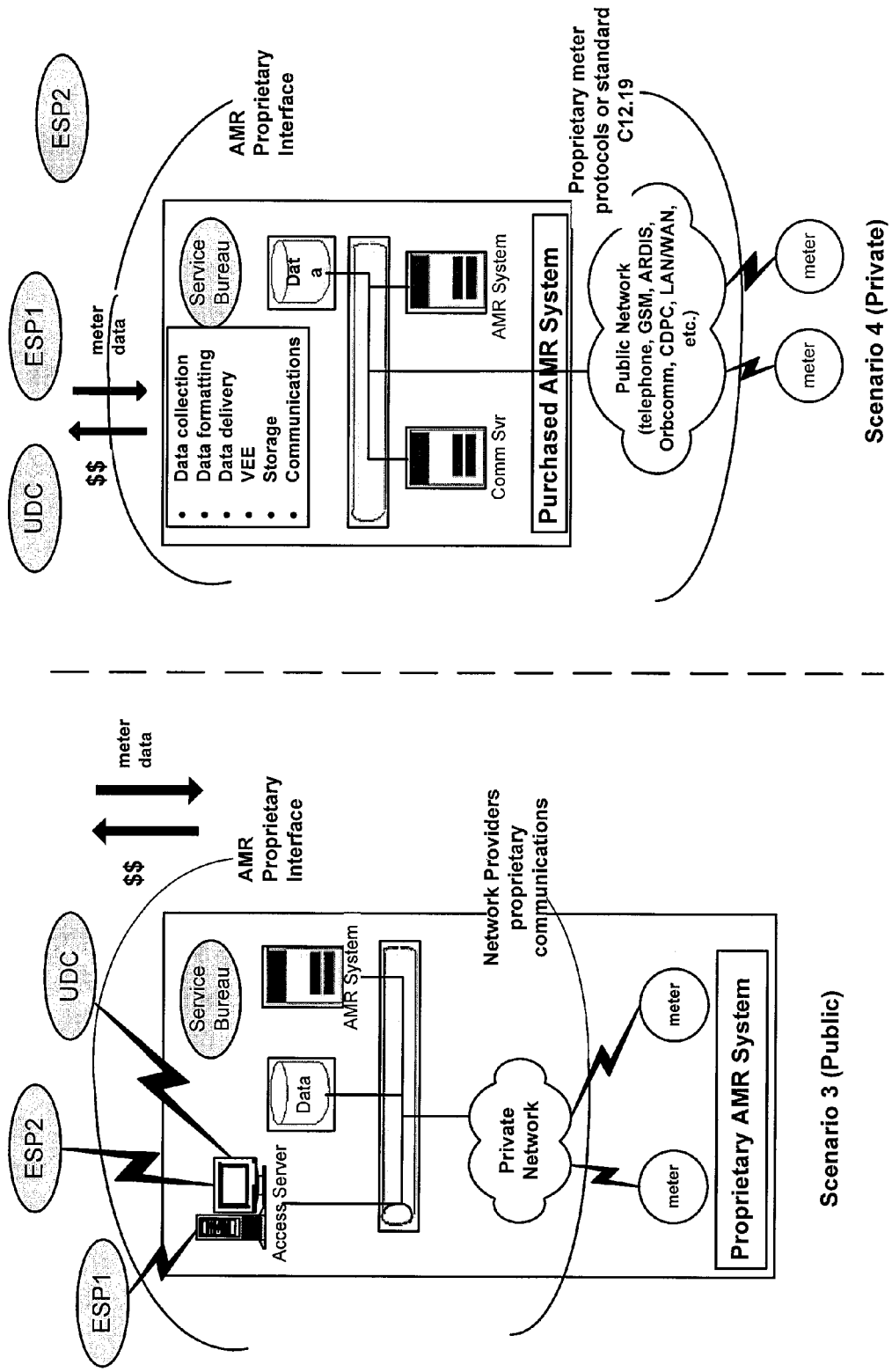
FIG. 2 schematically depicts two business scenarios that reflect current business models for service bureau AMR systems.
Figure 3:
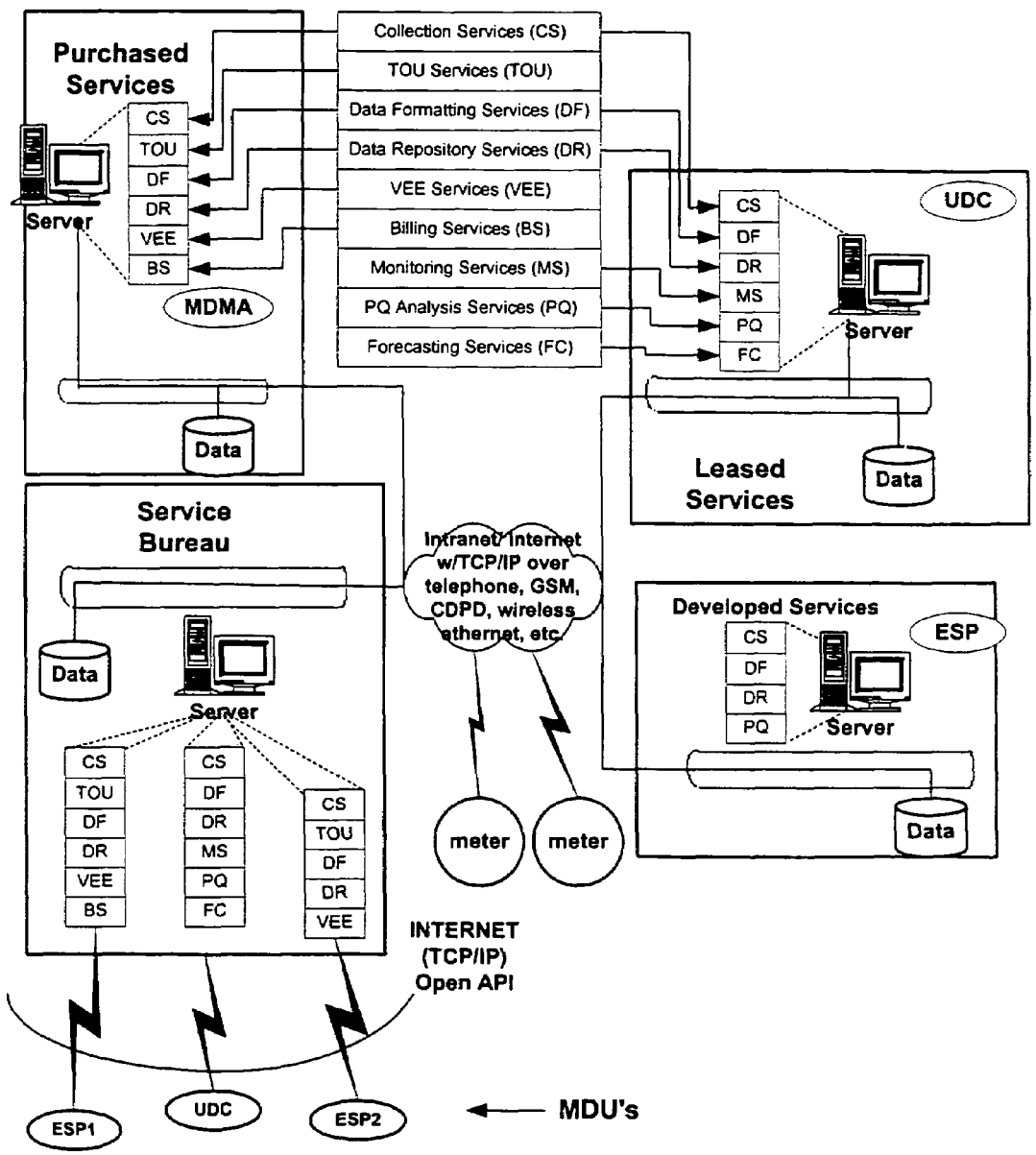
FIG. 3 illustrates a business model provided by the present invention.
Figure 4:
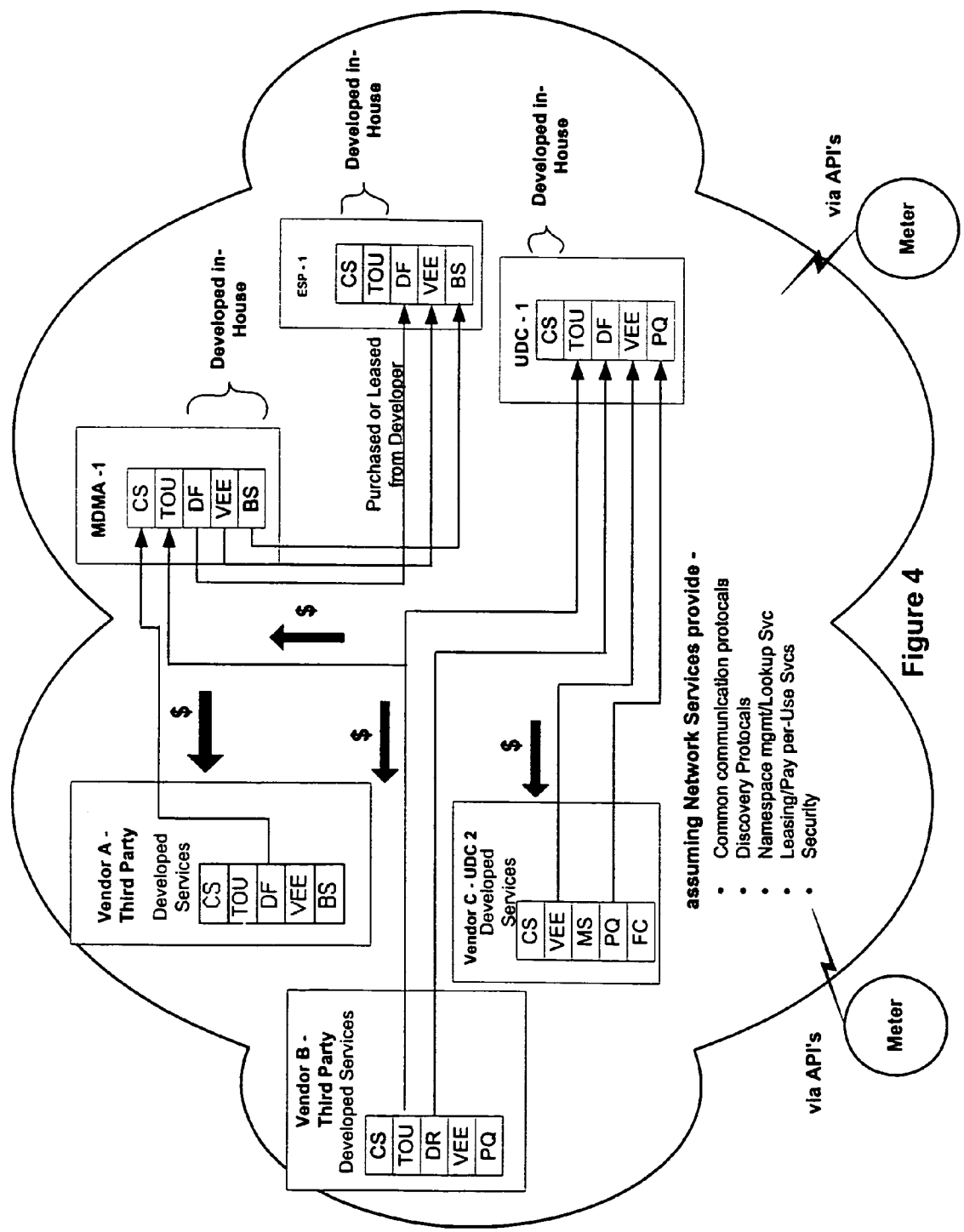
FIG. 4 illustrates revenue flow as a result of the sale/lease of metering services developed to work in a business model provided by the present invention.

FIGS. 3 and 4 illustrate how application services may be purchased (at a one-time cost), leased (on a time-of-use or pay-per-use basis), or developed in-house for processing raw and/or real-time meter data. In the system shown in FIG. 3, MDUs use metering service applications to process raw data collected from networked meters. The MDUs are denoted as follows in the various scenarios depicted in FIG. 3: "ESP1," "UDC," "ESP2" in the Service Bureau model; "MDMA" in the Purchased Services model; and "UDC" in the Leased Services model. Also, in FIG. 3, the suite of services applications are:

1) CS—Collection Services
2) TOU—Time of Use Services
3) DF—Data Formatting Services
4) DR—Data Repository Services
5) VEE—Validated, Estimated and Edited Data Services
6) BS—Billing Services
7) MS—Monitoring Services
8) PQ—Power Quality Analysis Services
9) FC—Forecasting Services.

FIG. 4 shows the revenue flow as services that process meter data are leased or purchased. This business model allows MDUs to have secure access, via application programming interfaces (APIs), to data collected by networked meters. With the deregulation of the electricity metering industry, metering data processing protocols are becoming standardized. This invention provides an open, standardized system that permits the high degree of customization and flexibility demanded by a deregulated metering environment. This enables vendors and meter data users to develop standardized data processing applications and value-added applications for sale, lease or in-house usage. FIGS. 3 and 4 show a sample of the type of services that benefit from defined/standardized APIs to address AMR operations. As shown in FIG. 4, some of the applications are developed in-house by the respective MDUs whereas others are leased or purchased for a fee (as indicated by the "$" signs and arrows).

Thus, the present invention may be implemented in a system that comprises network-based applications and network-enabled meters (electrical, gas, energy and water) that can provide full or part-time, secure connectivity between the meters and layered business applications using the Internet. Moreover, by employing object-oriented inter-networking technologies for embedded devices technology, this system provides a suite of products including meters, core services and networked applications that make meter information available to interested parties. The inter-network services are expected to provide common communications protocols, discovery protocols, namespace management (i.e., Directory or Lookup Service), leasing/pay-per-use services, and security (especially secure access to network-enabled meters).

System and Apparatus

Figure 5:
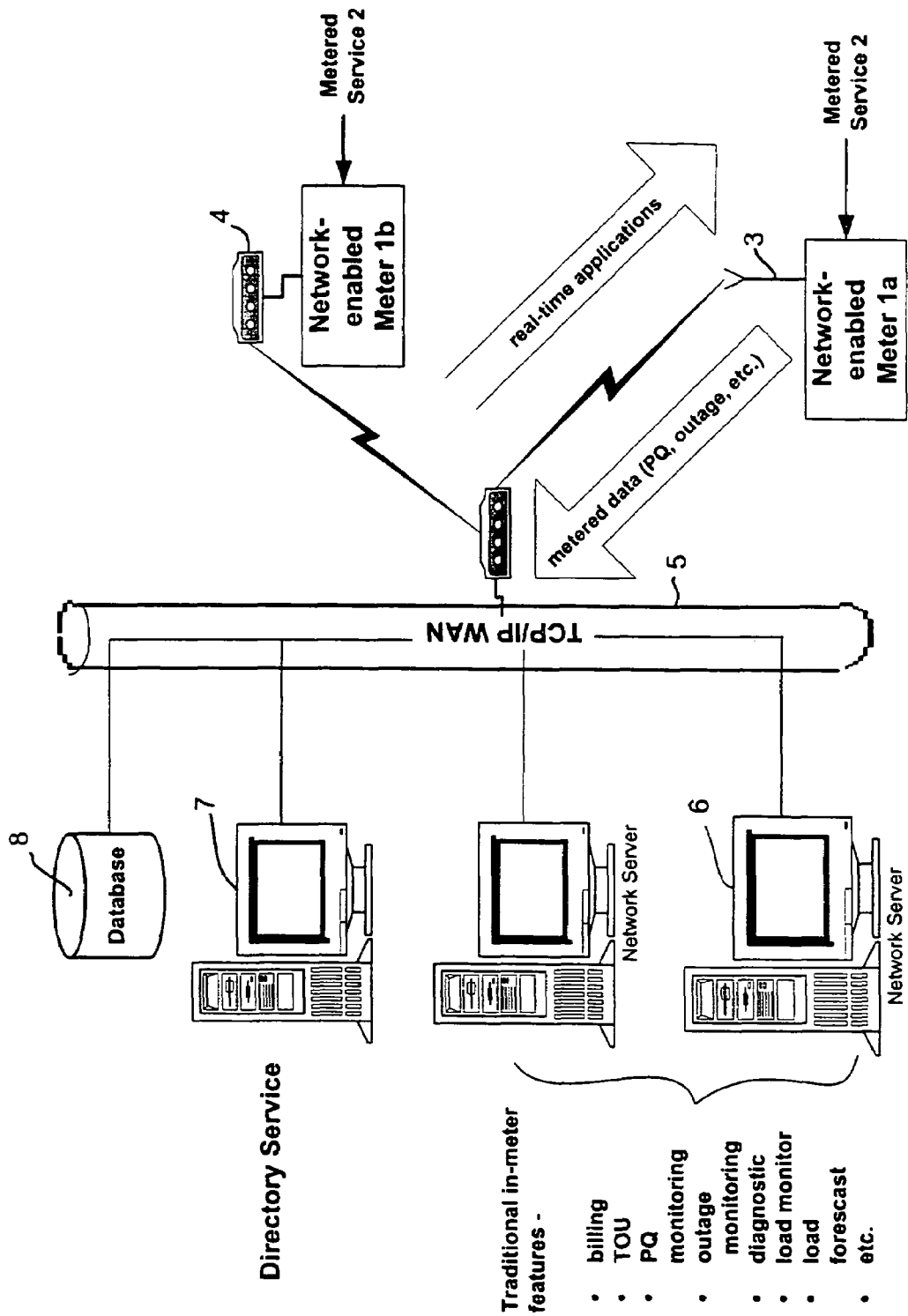
FIG. 5 illustrates an exemplary embodiment of a Network-enabled, Extensible Metering System in accordance with the present invention.

FIG. 5 schematically depicts an exemplary embodiment of a Network-enabled, Extensible Metering System in accordance with the present invention. As shown, metering devices 1 collect data on a metered service 2 and communicate the collected data via various communications devices 3 and 4 (antenna and modem, respectively) to a TCP/IP network 5. Also on the network 5 are various network devices for storing and processing the meter data; network servers 6; a directory server 7 for device location and interface location; and a database server 8 for storing raw and processed meter data and the meters' communication interfaces. This system allows the metering devices to upload raw metered data (e.g., kVARh, kWh, load profile, etc.) to the network 5 for processing and storage in the database 8 and the network servers to download real-time applications (e.g., power quality monitoring, alarm management, etc.) directly to a meter's leased/reserved memory and, based upon meter memory constraints, on a per-lease or on an as-needed basis.

Figure 6:
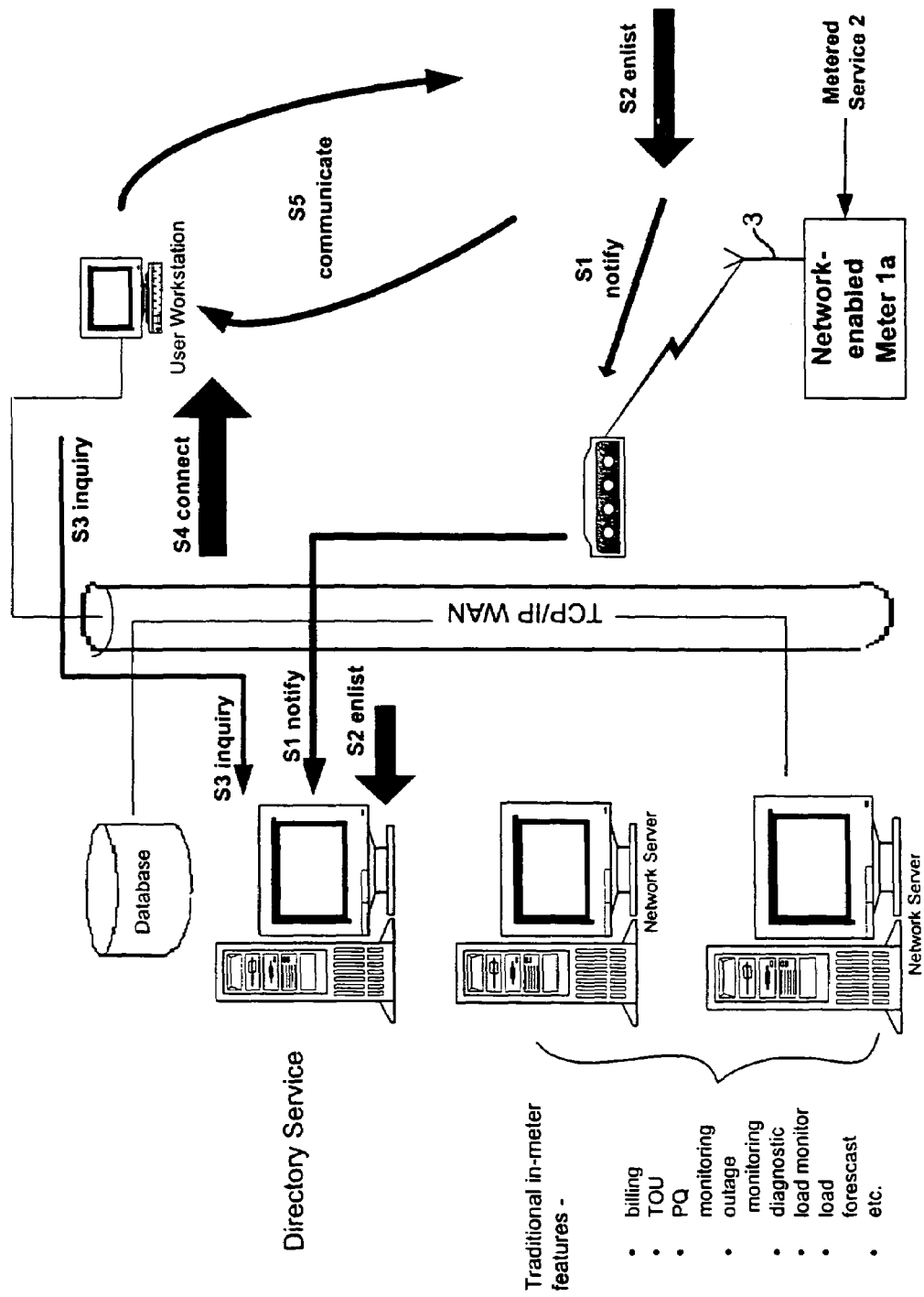
FIG. 6 is a data flow diagram that illustrates the data flow in the Network-enabled, Extensible Metering System.

FIG. 6 depicts data flow in the system. Instead of the system having embedded knowledge of meter protocols and specific communications access methods, the meter device itself delivers its protocol interface to the network-side Directory Service. As shown, in this system, a meter data user, or MDU, installs a meter (with an embedded networking device) at a customer's location. When the meter is connected to the network, it notifies the network's Directory Service that it is connected and ready to communicate (step S1). At the same time, the meter uploads its communications interface to the network database (step S2). A user or an application (e.g., a data retrieval system) requiring information from the meter asks for the meter's location from the Directory Service (step S3) and downloads the meter's communications interface (step S4). Now able to communicate directly with the meter without having prior meter-specific protocol knowledge, the user or application communicates directly with the meter and accesses the needed information (step S5). Access to the applications necessary to process the meter's information may be made available to the MDU on a pay-per-use and/or pay-by-time lease basis. This process allows meter data users to purchase a simple meter (with embedded networking technology) with little to no embedded applications. Applications needed to extend the functionality of a meter can then be developed, leased or purchased on an as-needed basis and executed at the network level. This system could also push needed applications out to the meter for execution at the meter level (e.g., real-time functions such as power quality monitoring, alarm monitoring, etc). Since the traditional in-meter applications are removed from the meter and placed at the network level, new applications can be easily developed and quickly implemented via the network to support future functionality and features that are not yet needed in today's deregulated environment. These applications may be purchased or leased from a third party vendor or developed by the meter data user. Applications developed by the meter data user could be sold or leased to other meter data users to generate additional revenue. This changes the business model for metering from a model where money is made on the meter device itself to a service-based model where the information is paid for each time it is accessed or used. In this model, the metered information becomes the revenue generator.

Figure 7:
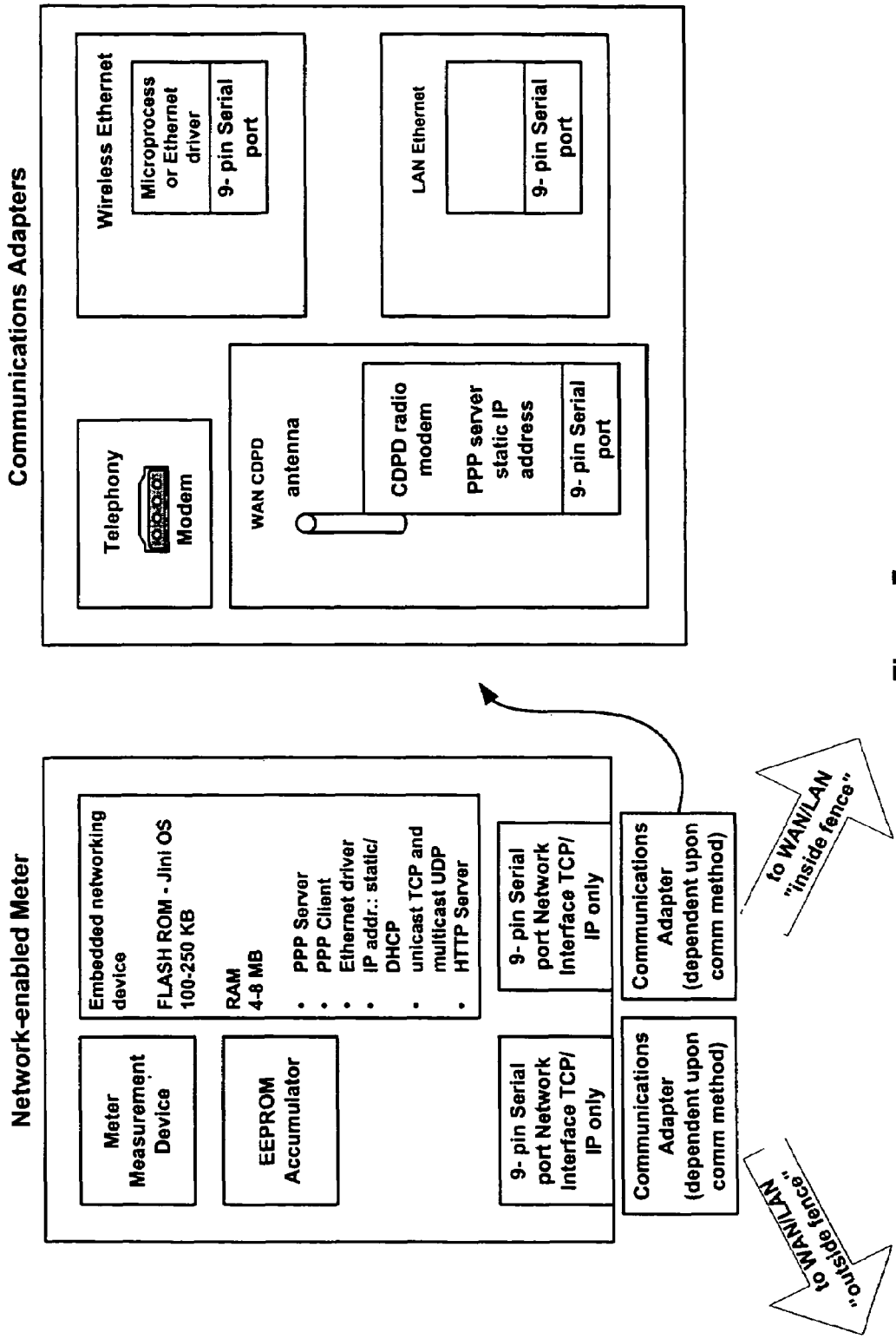
FIG. 7 illustrates the components of an embedded, network-enabled metering device and communications adapters used to connect the device to a network.

FIG. 7 depicts the components of an embedded, network-enabled metering device and the possible communications adapters used to connect the device to a network (LAN or WAN). As shown, such a metering device could include a measuring device, an accumulator for collecting the metered data, memory for storage, and some type of connector or port for connecting to a communications adapter. The various communications adapters would accommodate telephony, WAN CDPD, wireless Ethernet, and LAN Ethernet. Such a system would be easily expanded as communications technologies improve and are expanded. The network-enabled meter becomes a simple metering device that collects and stores raw (unprocessed) meter data (i.e., the quantities that can be measured are finite). The variety of communications adapters provide the meter with the means to communicate with the users and applications on the network system.

FIG. 8 illustrates various methods for connecting legacy metering devices (e.g., electromechanical or electronic meters that are not network-enabled) to the system. One manner of enabling a meter to interface with a network would be composed of either an internal or external hardware adapter that would provide the embedded network connectivity. Another way involves an interface application located on the system's network end. The adapters and system application would contain the necessary communications and device interface information that would enable any user or device connected to the network to communicate with the legacy metering device.

Figure 9:
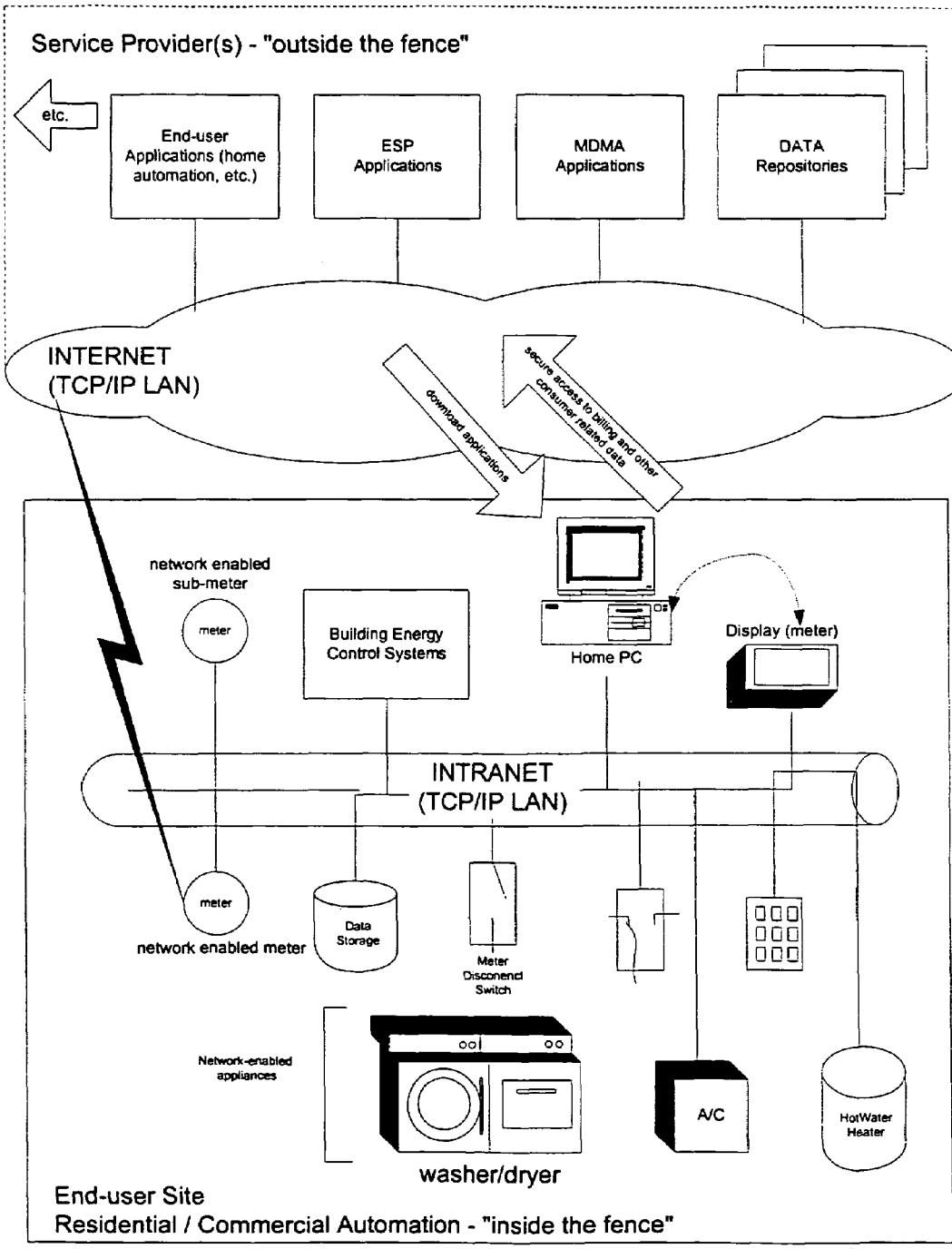
FIG. 9 depicts an end-user ("outside the fence") to Network-enabled, Extensible Metering System ("inside the fence") scenario.

FIG. 9 illustrates an end-user to Network-enabled, Extensible Metering System scenario. In this scenario, network-enabled applications residing on a meter data user's (such as an energy service provider) network would have direct access (via radio-frequency, Internet, etc.) to the metered data of an end-user (e.g., a residential or a commercial/industrial customer). The meter data user side of the system would store the metered data in either independent or cumulative data repositories. Additionally, the meter data user side may is able to download or push real-time meter applications out to the metering device as needed. On the end-user side of the system (furnished with various network-enabled devices: a display, a meter, home automation devices, etc.), the user may lease or purchase a service package of applications from the meter data user that enables the user to perform a variety of functions, e.g., TOU analysis, load shedding, power quality monitoring, etc.

In the inventive system, the network-enabled meter ceases to be the sole revenue-generating commodity for manufacturers. Instead, the meter and the software systems that access and process its data become a continuous source of revenue. The meter becomes a simple device that requires no programming and fewer upgrades. The meter's functionality is no longer limited by the volume "under the glass" but becomes virtually unlimited by having the functionality residing on the network and accessed on an as-needed basis by the networked applications. Networked applications use the same service infrastructure as the networked meter. E.g., the networked applications use the network discovery, join and lookup services to find other application services just as applications use network infrastructure to find meter services. Networked applications register the services they offer with the Lookup services, just as the meter does. This allows both networked meters and networked applications to work in a transparent federation of services. In order for applications and meters to cooperate in a federation of services, the service interfaces must be predefined into a set of Open APIs. These applications can include storage of metered information, load profiling, data aggregation, power quality monitoring, tariff calculations, outage notifications, etc. Meter data users may decide which applications they need and either choose the application provider or develop the needed application in-house. If an application provider were selected, then the application would be paid for on either a per-use basis or leased for a set period of time. New or expanded functions and features could be easily added to the system and just as easily implemented by the meter data users. An additional benefit of having the applications residing on the network rather than in the meter is that feature upgrades or meter updates or maintenance occurs at the network level rather that in the meter at the customer's site. Thus, by decreasing the complexity of the meter, the probability for errors at the meter level is decreased, making maintenance and upgrades easier and more efficient.

Using the virtually unlimited processing power and capacity of a network, the capabilities of a meter also become virtually unlimited. When a meter requires an upgrade or patch, a Meter Service Provider could "push" the new code to all affected meters with a single command instead of physically removing each and every affected meter and transporting them to the meter shop for firmware/software upgrades. The upgrades would take effect immediately, making the new functionality instantaneously available to meter data users.

In addition to allowing meter data users to directly access and process meter data, the system allows meter data users to provide certain end user processes (e.g., service disconnect, on-site usage display, etc.), as shown in FIG. 9. End users (i.e., energy consumers) could lease or purchase applications from a meter data user, which would enable on-site control and monitoring of energy consumption, usage, etc. Appliances that implement embedded network-enabling devices can be managed and monitored by the meter data user and/or the end-user. An added feature for the end-user is in the field of home or business automation for building and energy management. Currently, end-user devices and applications designed for home/business automation must implement one of a variety of protocols (e.g., LonWorks, CEBus, X10, etc.). In the present system, a common communication protocol (TCP/IP) unifies development of automation devices and applications. Such a system would enable end-user pre-payment, real-time and "energy exchanges" pricing, and even on-site payment via a card reader. Energy management applications (like demand management or load shedding) could be easily monitored and configured by both the meter data user and the end-user.

CONCLUSION

With this invention, the meter data user, or MDU, that decides upon an exclusive ownership business model will be capable of assembling services provided by many suppliers to create the AMR System that best suits their business case. In addition, the MDU can elect to develop certain services to add value or lease to other MDUs. This increases a MDU's flexibility to generate revenue, reduces their dependence upon a sole AMR System provider, and reduces their overall risk. This invention also strengthens the service bureau business model by allowing a service bureau operator to assemble and/or develop different services for different MDU subscribers. These MDU subscribers can in turn develop value-added services of their own in order to gain competitive advantage. Finally, this invention helps the AMR Suppliers by creating well-defined services that makeup an AMR System. The AMR Suppliers can decide which services they can best develop to generate an ongoing revenue stream, not a series of one time, customized AMR System sales.

In sum, the present invention provides a novel system based on a network-enabled, extensible meter. It is understood, however, that the invention is susceptible to various modifications and alternative constructions. There is no intention to limit the invention to the specific constructions described herein. E.g., the various techniques described herein may be implemented in a variety of hardware or software, or a combination of both. Preferably, the techniques are implemented in utility metering components having programmable processors, a storage medium readable by the processor (including volatile and non-volatile memory and/or disk storage elements), and various application programs. Each program may be implemented in assembly or machine language. However, the programs can be implemented in a high level procedural or object oriented programming language to communicate with a computer system. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be implemented as a computer-readable storage medium, configured with a computer program, where the storage medium so configured causes a computer to operate in a specific and predefined manner.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention as defined in the following claims.

We claim:

1. A networked-based, extensible metering system, comprising:
    (a) a TCP/IP network;
    (b) a directory service coupled to the TCP/IP network;
    (c) a plurality of network-enabled meters coupled to the TCP/IP network, different ones of the network-enabled meters having different communications interface protocols by which they communicate over the TCP/IP network, each of the network-enabled meters uploading its location and its respective communications interface protocol to the directory service; and
    (d) one or more network servers that execute a plurality of different applications, each application processing data collected from one or more of the network-enabled meters to provide a respective metering service, the applications communicating with the network-enabled meters using their respective communications protocols obtained from the directory service,
    wherein the one or more network servers permit different meter data users to purchase or lease different combinations of the metering services provided by the applications executing thereon.

2. A system as recited in claim 1, wherein each network-enabled meter includes a network communication device.

3. A system as recited in claim 1, wherein the TCP/IP network comprises the Internet.

4. A system as recited in claim 1, wherein the TCP/IP network comprises an intranet.

5. A system as recited in claim 1, wherein the TCP/IP network comprises a wide area network.

6. A system as recited in claim 1, wherein said applications are upgradeable on the network.

7. A system as recited in claim 1, wherein other applications are downloaded to one or more of the network-enabled meters and are activated on each meter on a real-time basis.

8. A system as recited in claim 1, wherein multiple meter data users can purchase or lease the same or different metering services for the same meter.

9. A system as recited in claim 1, wherein the meter consists of a reduced set of internal hardware and firmware required for traditional metering devices.

10. A system as recited in claim 1, further comprising network-enabling adaptors that allow legacy metering devices to interface with the TCP/IP network and to communicate with the one or more network servers.

11. A system as recited in claim 1, further comprising communications adaptors to allow protocol-dependent communication between users and applications and the network-enabled meters.

* * * * *